United States Patent [19]
Bucknam

[11] Patent Number: 5,621,252
[45] Date of Patent: Apr. 15, 1997

[54] APPARATUS FOR PREVENTING UNAUTHORIZED USE OF MACHINERY

[76] Inventor: Steven H. Bucknam, 1269 Kingsway Dr., Chesapeake, Va. 23320

[21] Appl. No.: 239,558

[22] Filed: May 9, 1994

[51] Int. Cl.$^6$ .................. B60R 25/10; B60R 25/04
[52] U.S. Cl. ............... 307/10.2; 307/10.3; 180/28.7; 340/426
[58] Field of Search ............... 307/9.1–10.8, 307/139, 140; 340/425.5, 426, 428, 430, 825.31, 825.61, 825.66, 825.72; 180/287, 288; 123/198 B, 198 PB, 198 DG

[56] References Cited

U.S. PATENT DOCUMENTS

| | | | |
|---|---|---|---|
| 2,515,044 | 1/1948 | Kappel | 307/10.3 |
| 3,194,970 | 8/1962 | Claps | 307/10.3 |
| 3,439,771 | 10/1967 | Commins | 180/287 |
| 3,614,458 | 10/1971 | Stein | 180/287 |
| 3,623,569 | 11/1971 | Wilkins | 307/10.2 |
| 3,637,037 | 1/1972 | Doland | 180/287 |
| 3,656,574 | 4/1972 | Edwards | 180/287 |
| 3,850,260 | 11/1974 | Obermeit | 180/287 |
| 4,300,495 | 11/1981 | Trevino et al. | 123/198 B |
| 4,315,160 | 2/1982 | Levine | 307/10.3 |
| 4,485,887 | 12/1984 | Morano | 180/287 |
| 4,636,651 | 1/1987 | Kilgore | 307/10.3 |
| 4,733,638 | 3/1988 | Anderson | 180/287 |
| 4,739,736 | 4/1988 | Branco | 123/179.3 |
| 4,762,198 | 8/1988 | Vagnone et al. | 180/287 |
| 4,792,792 | 12/1988 | Costino | 307/10.3 |
| 4,852,681 | 8/1989 | Bombled | 307/10.2 |
| 4,866,296 | 9/1989 | Thomas | 307/10.2 |
| 4,992,670 | 2/1991 | Pastor | 307/10.3 |
| 5,061,915 | 10/1991 | Murphy | 307/10.1 |
| 5,115,145 | 5/1992 | Westberg et al. | 307/10.3 |
| 5,180,924 | 1/1993 | Rudisel | 307/10.6 |

*Primary Examiner*—William M. Shoop, Jr.
*Assistant Examiner*—Peter Ganjoo
*Attorney, Agent, or Firm*—Griffin, Butler, Whisenhunt & Kurtossy

[57] ABSTRACT

An apparatus for preventing unauthorized use of machinery having an internal combustion engine (such as a motor vehicle) comprises an interruption subcomponent (46) for controlling flow of electrical current to an electrical ignition system (18) by allowing electrical current to flow from a power supply (10) to the electrical ignition system when the internal combustion engine is started, and thereby allowing the engine to run, and for interrupting this flow in response to an operator preforming an activity for further operating the machine (such as applying brakes or shifting gears). The apparatus also includes an arming subcomponent (48) for arming the interruption subcomponent (46) in response to the engine being started and disarming the interruption subcomponent in response to a manual manipulation of a switch (42, 44) of the arming subcomponent. In the described embodiment, the interruption and arming subcomponents respectively include interruption and arming solenoid switches. In one embodiment a parallel temporary ignition path (100) is included so that an ignition key can be removed during engine warm up.

11 Claims, 2 Drawing Sheets

APPARATUS FOR PREVENTING UNAUTHORIZED USE OF MACHINERY

BACKGROUND OF THE INVENTION

This invention relates generally to apparatus for preventing unauthorized use of machinery (such as motor vehicles) and more particularly to such apparatus that employ ignition circuit interrupt systems to prevent such unauthorized use.

Numerous systems and methods have been suggested in the past for deenergizing an ignition circuit of a motor vehicle and sounding alarms upon an unauthorized attempt to move the vehicle. The designs of many such systems have involved the use of energized relays or solenoids to complete vital links in the ignition circuit. That is, when power has been removed from these relays, or solenoids, these links have been broken and internal combustion engines energized thereby have stopped running. Such systems have had the disadvantage of creating an obvious danger in that, if such a device should experience failure during operation of a vehicle equipped therewith, engine failure would automatically result, thereby endangering lives of a vehicle operator, passengers and motorists of other cars.

Other designs have required operators to flip switches prior to leaving their vehicles in order to arm devices so that unauthorized operators, who do not know how to disarm the devices cannot thereafter use the vehicles. Such a design places responsibility on the operator to actively take part in setting it. Unfortunately, many operators forget to manipulate the switches or consciously decide not to manipulate them so that their vehicles remain unprotected. In addition, some such devices suffer from an additional drawback in that if the switches are inadvertently manipulated during vehicle operation automatic engine failure immediately follows, thereby also creating life threatening situations.

Still other designs require operators to insert keys into ignition switches and then perform acts or series of acts, to disarm devices prior to attempting engine starts. Depending on particular designs, such actions required prior to engine starts can be awkward and frustrating for operators. Thus, these designs often lead to operators disabling the devices in order to avoid the inconveniences involved in using them.

Most anti-theft devices do not allow operators to remove keys from ignition switches while still allowing engines to warm up.

There are anti-theft devices that exist which interrupt, or drain, normal current flow to vehicle ignition coils. Unfortunately, many of these devices are incompatible with computer controlled ignition systems often used in automobiles today. In this regard, it is unknown what effect such devices have on ignition computers which attempt to compensate for sensed faults.

Some prior-art anti-theft devices are designed to isolate starters. Intelligent thieves can easily recognize this as not being a likely characteristic of modern vehicles and are thereby "tipped of" to search for and disarm such devices.

For all of the above reasons, it is an object of this invention to provide an apparatus for preventing unauthorized use of machinery (such as motor vehicles) which:

- operates in a fail-safe mode so that it will not interfere with a vehicle's ignition system during normal operation if it or its wiring fails;
- employs a totally passive reset capability;
- cannot interfere with normal machinery operation upon purposeful or inadvertent activation of a switch;
- allows an internal-combustion engine to be started normally and then disarmed at an operator's leisure;
- provides a false sense of accomplishment to a potential thief for thereby denying him the knowledge that an anti-theft device has been installed;
- allows an authorized operator of a vehicle to leave the vehicle idling without leaving the ignition key in the vehicle, but with the anti-theft device armed;
- can be used during warm-up operations;
- is safe for use on all types of ignition circuits, including computer-controlled, electronic, and conventional ignition circuits;
- alerts an authorized owner of an attempted theft or unauthorized used;
- is difficult to disable and does not alert thieves of its existence;
- does not drain a battery current;
- can be bypassed to allow authorized use by third parties (such as maintenance personnel, valet parking attendants, etc.) without disclosing hidden switch positions;
- allows stalled engine restarts without having to reset the device; and
- is economical to manufacture, easy and economical to install and is convenient and safe for an owner to operate.

SUMMARY OF THE INVENTION

According to principles of this invention, an apparatus for preventing unauthorized use of machinery (such as motor vehicles) having internal combustion engines has an interruption subcomponent for allowing electrical current to flow from a power supply to an electrical ignition system when the internal combustion engine is started, but for thereafter interrupting this flow in response to a machine operator performing an activity for further operating the machine. The apparatus further includes an arming subcomponent for arming the interruption subcomponent in response to the engine being started and disarming the interruption subcomponent in response to a manual manipulation of a switch of the arming subcomponent. The interruption subcomponent includes an interruption solenoid switch and the arming subcomponent includes an arming solenoid switch which allows operation of either a brake light switch or a reverse light switch to activate the interruption solenoid switch. The arming subcomponent also includes a temporary ignition path in parallel with a normal ignition path so that when the arming subcomponent is in an armed condition the machinery can be operated independently of the normal ignition path.

BRIEF DESCRIPTION OF THE DRAWINGS

The invention is described and explained in more 15 detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same Darts throughout the different views. The drawings are not necessarily to scale, emphasis instead being placed upon illustrating principles of the invention in a clear manner.

DESCRIPTION OF THE PREFERRED EMBODIMENT

Figure 1:
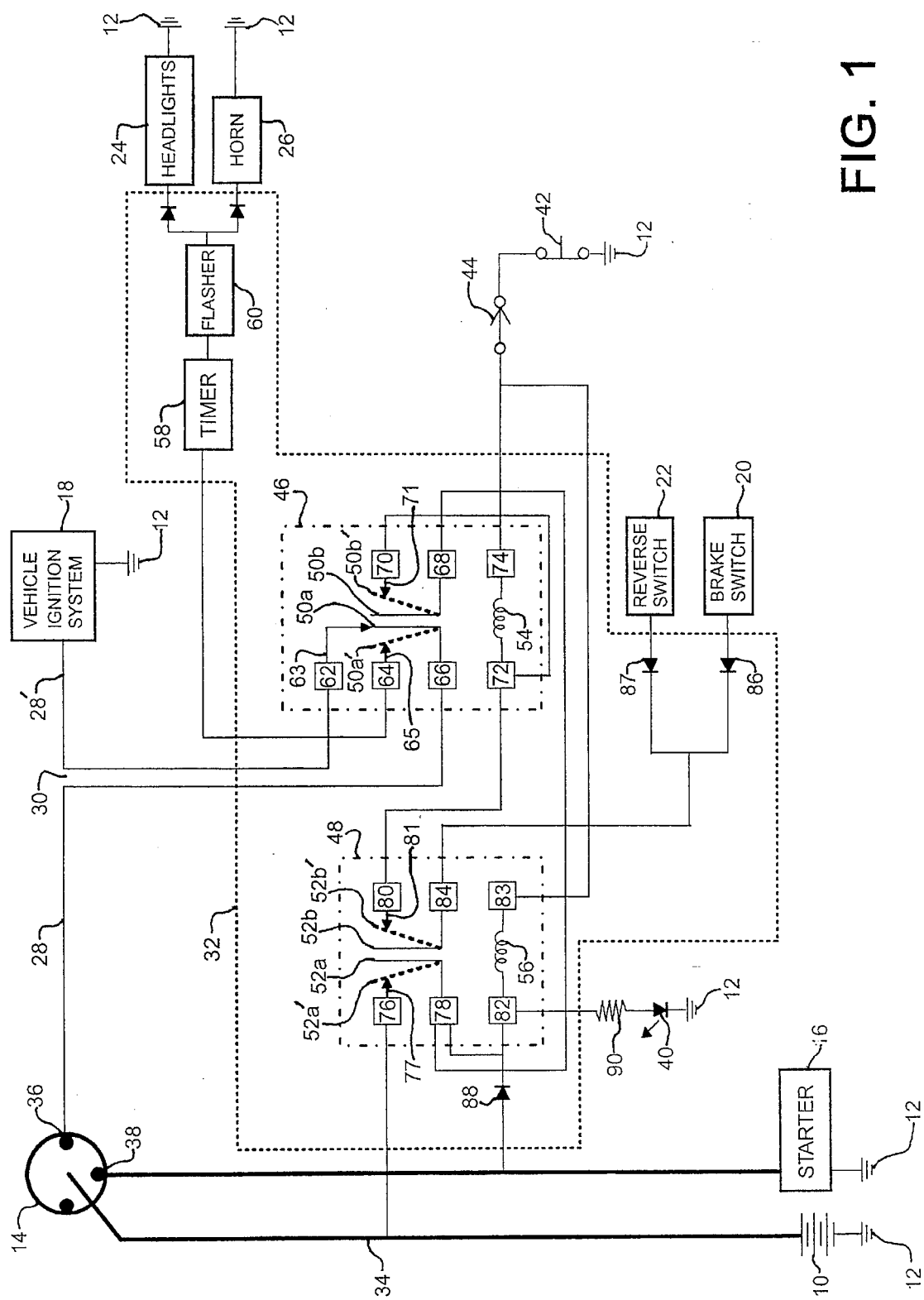
FIG. 1 is a schematic view of an apparatus of this invention for preventing unauthorized use of machinery along with pertinent components of a motor vehicle on which it is installed.

An apparatus for preventing unauthorized use of a machine having an internal combustion engine (such as a motor vehicle) of this invention is shown in FIG. 1 mounted on a motor vehicle. In this regard, only the pertinent portions of the motor vehicle are depicted in FIG. 1 as follows: a vehicle power supply (battery and alternator) 10, a vehicle chassis ground 12, a vehicle, key-operated, ignition switch 14, a vehicle starter 16, a vehicle ignition system 18, a vehicle brake light switch 20, a vehicle reverse light switch 22, headlights 24, and a horn 26. All of these elements are standard elements of vehicles and they are interconnected with the vehicle and with one another in a standard way with one exception: instead of an ignition conductor 28 being coupled directly from the ignition switch 14 to the vehicle ignition system 18, as would normally be the case, it is broken at 30 with the ignition conductor 28 and 28' passing through an ignition control component 32 of the "apparatus for preventing unauthorized use" of the vehicle.

As is normally the case, when the vehicle is not operating, the ignition switch 14 does not distribute electrical energy received from a power-source conductor 34 to an ignition terminal 36 nor to a starter terminal 38. However, when the vehicle is started, with a key inserted in the ignition switch 14 and rotated, a continual electrical energy is applied to the ignition terminal 36 and momentary electrical energy is applied to the starter terminal 38 for thereby energizing the starter 16 and starting the internal-combustion engine.

In addition to the ignition control component 32, the apparatus for preventing unauthorized use of the vehicle includes an armed indicator 40, a normally-closed momentary disarming switch 42, and a bistable continuous deactivating switch 44.

The ignition control component 32 is contained in a single housing which is remotely mounted, for example under a hood of a vehicle. The ignition control component 32 primarily comprises an interruption subcomponent 46 and an arming subcomponent 48, both of which are delineated in the drawings by imaginary dot-dash lines. In the depicted embodiment, the respective interrupting and arming subcomponents 46 and 48 are primarily interrupting and arming solenoid switches 46 and 48. Squares in the interrupting and arming solenoid switches 46 and 48 indicate connection terminals and arrows indicate stationary contacts. Both the interrupting and arming solenoid switches 46 and 48 have moveable contacts 50 and 52 whose "at rest" positions are shown by solid lines 50a, 50b and 52a, 52b. The moveable contacts 50, 52 are in these "at rest" positions when the engine of the machinery (motor vehicle) has not been started and moveable contacts 50 will remain in these "at rest" positions even after the engine has been started but the machinery has not yet been driven. Dashed line positions 50a', 50b and 52a 52b of the moveable contacts 50 and 52 are their positions when the respective relay coils 54 and 56 have been energized. Thus, when the vehicle has not been started, and these relay coils have not been energized, the ignition conductor 28 from the ignition switch 14 is coupled to the vehicle ignition system 18 by the moveable contact 50a (solid line) of the interrupting solenoid switch 46.

However, when a relay coil 54 of the interrupting solenoid switch 46 is energized, power is detoured, via the moveable contact 50a (dashed line), to a timer 58 and a flasher 60 for causing the headlights 24 and the horn 26 to give off an intermittent alarm for a period of time, thereby indicating to an authorized operator that some unauthorized person is trying to utilize his vehicle.

Describing the structures of the solenoid switches 46 and 48 in detail, a first terminal 62 of the interrupting solenoid switch 46 is coupled to the vehicle ignition system 18 and has a stationary contact 63; a second terminal 64 is coupled to the timer 58 and flasher 60 and has a stationary contact 65; a third terminal 66 is coupled to the ignition conductor 28 and has the moveable contact 50a; a fourth terminal 68 is coupled to a second terminal 78 of the arming solenoid switch 48 and has the moveable contact 50b; and a fifth terminal 70 is coupled to a sixth terminal 72 and has a stationary contact 71; the sixth terminal 72 is connected to a fourth terminal 80 of the arming solenoid switch 48, to one end of the relay coil 54 and to the fifth terminal 70 of the interrupting solenoid switch 46; and the seventh terminal 74 is coupled to the other end of the relay coil 54 and to the continuous and momentary disarming switches 44 and 42. A first terminal 76 of the arming solenoid switch 48 is coupled to the power supply 10 and has a stationary contact 77; the second terminal 78 is coupled to a fifth terminal 82 of the arming solenoid switch 48 and to the fourth terminal 68 of the interrupting solenoid switch 46 and has a moveable contact 52A; a third terminal 84 is coupled to the brake light switch 20 via a diode 86 and has the moveable contact 52 b; the fourth terminal 80 is coupled to the sixth terminal 72 of the interrupting solenoid switch 46 and has a stationary contact 81; the fifth terminal 82 is coupled to the starter energizing line via a diode 88, to the LED armed indicator 40 via a resister 90, to one end of the relay coil 56 of the arming solenoid switch 48, and to the second terminal 78 of the arming solenoid switch 48; and a sixth terminal 83 is coupled to the other end of the relay coil 56 and to the seventh terminal 74 of the interrupting solenoid switch 46.

Describing now overall operation of the apparatus for preventing unauthorized use of the motor vehicle as it is depicted in FIG. 1, a key is inserted by an authorized operator into the ignition switch 14 and is rotated so that the ignition switch 14 transmits electrical current from the power supply 10 to the ignition conductor 28 and, initially, also to the starter 16. Since the interrupting solenoid switch 46 is in its "at rest" position in which it allows current flow via the moveable contact 50a along the ignition conductor 28, 28' to the vehicle ignition system 18, the engine can be started by the starter. However, at the same time the starter 16 is energized, the relay coil 56 of the arming solenoid switch 48 is energized by a current flowing through the diode 88 and through the continuous and momentary disarming switches 44 and 42 to ground 12. Activation of the relay coil 56 causes the moveable contacts 52a and 52b to move to their dashed positions 52a' and 52b. Moveable contact 52a then also causes a current flow from the power supply 10 through the relay coil 56, thereby assuring that the relay coil 56 is energized even once energy to the starter motor 16 is released. Thus the solenoid switch 48 is latched to an energized, armed, configuration. In this armed configuration the moveable contact 52b completes a circuit from the brake light switch 20 and the reverse light switch 22 through the relay coil 54 of the interrupting subcomponent 46, and the continuous and momentary disarming switches 44 and 42, to ground 12. However, at this point, the brake of the vehicle will not have been pressed nor will the vehicle gear shift have been placed in reverse. Thus, the brake light switch and the reverse light switch will not have been energized and, the relay coil 54 of the interrupting solenoid switch 46 will likewise not have been thereby energized. Thus, the moveable contact 50a will remain in the solid line position continuing to energize the vehicle ignition system 18 via the ignition conductor 28.

At this point, the operator has started the engine and can leave the vehicle, with the engine running to allow the engine "heat up". Should an unauthorized person try to drive the vehicle, as soon as he performs an activity directed toward doing this, namely, depressing the brake pedal to activate the brake light switch or placing the gear shift in reverse to activate the reverse light switch, he will thereby energize the relay coil 54, which will, in turn, move the moveable contact 50a and 50b to the dashed line positions 50a' and 50b' of the interrupting solenoid switch 46. When the moveable contact 50a moves, it automatically interrupts the path to the vehicle ignition system 18, thus, the engine turns off. At the same time, it completes a path to the timer 58 and the flasher 60 for thereby intermittently activating the 12 headlights and horn of the vehicle to provide an alarm. Movement of the moveable contact 50b to the 50b' position provides continuous power to energize the relay coil 54, thereby latching the interrupting solenoid switch 46 to an interrupting condition so that the vehicle cannot be driven until the momentary disarming switch 42 or the continuous disarming switch 44 (each of which is part of an overall arming assembly) is opened to deenergize both of the relay coils 54 and 56.

If the authorized operator starts the engine as described above and there is no intervening attempt to drive the vehicle by an unauthorized operator, the authorized operator, prior to driving the vehicle, manually opens the normally-closed momentary disarming switch 42 to thereby deactivate the relay coil 56 and the relay coil 54. Deactivation of the relay coils moves the moveable contacts 52a and b of the arming solenoid switch 48 to the disarmed solid line position. That is, the relay coil 56 is no longer continuously energized and there is no longer a completed path from the brake light switch 20 and the reverse light switch 22 through the relay coil 54. Also, the moveable contacts 50a and 50b of the interrupting solenoid switch 46 stay in the solid-line position in which the vehicle ignition system 18 is fully energized via the ignition conductor 28, 28'.

it will be appreciated by those of ordinary skill in the art that a similar sequence of events will prevent a thief from driving a car on which the device of this invention has been installed after he has "hot wired" it and started it.

It will also be appreciated by those of ordinary skill in the art that the armed indicator 40 is in a location which can be easily viewed by an operator to remind him that he must manually operate the momentary disarming switch 42 before driving the vehicle. The momentary disarming switch 42 is located in a hidden position known only to the authorized operator. This switch is biased toward a closed position thus, once the operator manually moves it to break the switch it moves back to a closed position automatically.

The continuous deactivating switch 44, on the other hand, is a bistable switch which also can be located in a remote, hidden position. This switch is operated when one wishes to completely deactivate the system on a continuous basis. For example, when one gives his car to a parking attendant or to maintenance personnel, he may wish to totally deactivate the system. In one embodiment the continuous deactivating switch 44 can only be operated with a special tool.

Figure 2:
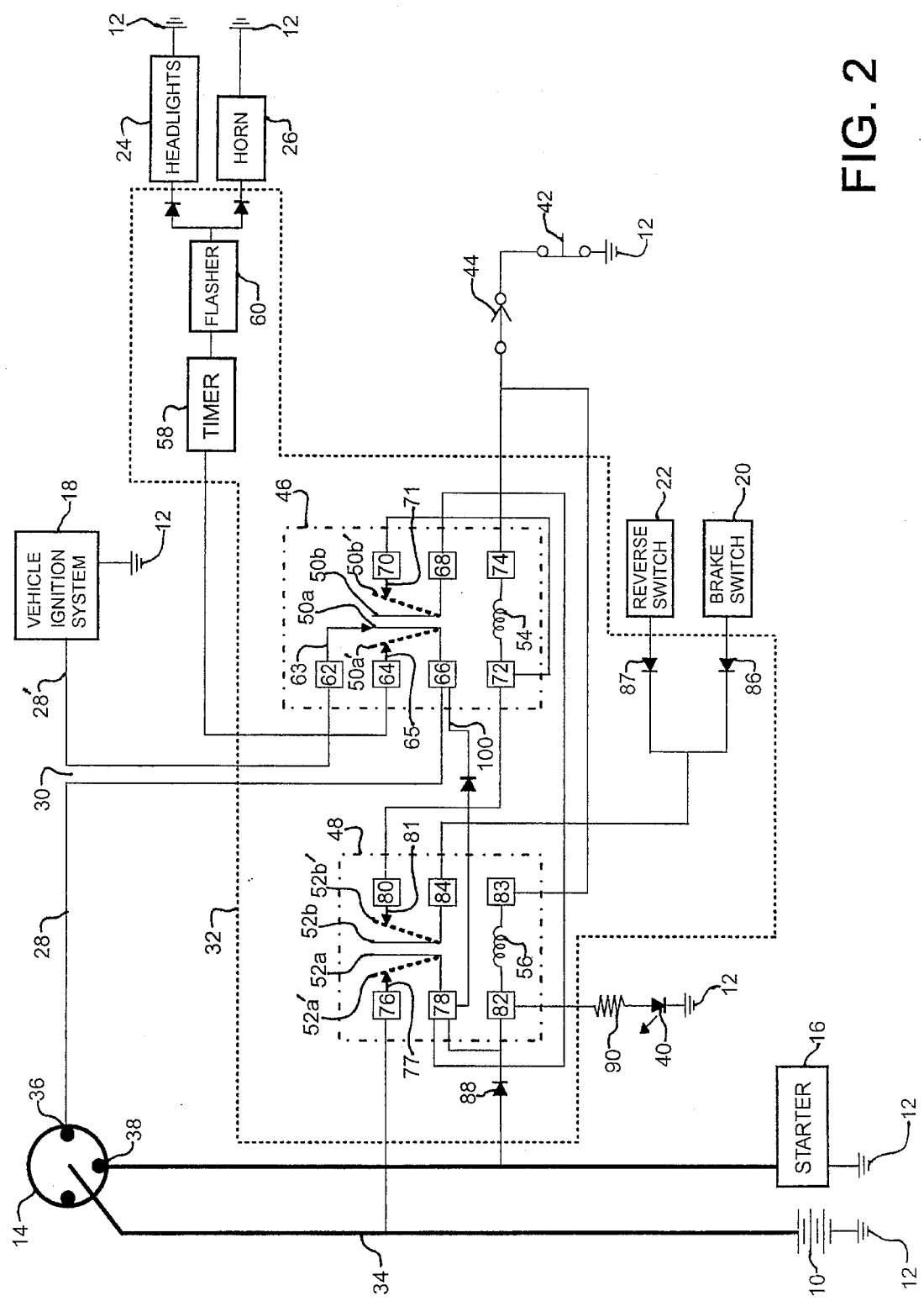
FIG. 2 is a view similar to that of FIG. 1 of an alternate embodiment of this invention.

The embodiment depicted in FIG. 2 is exactly like that in FIG. 1 with the exception that it also includes a parallel temporary ignition path 100 which allows the authorized operator to remove the key from the ignition switch 14 after he has started his vehicle and left it for warmup. In this regard, even if the authorized operator has turned the ignition switch 14 to an off position and removed the key, after starting the engine, current continues to flow through the diode 88 the terminal 82, the terminal 78, the parallel temporary ignition path 100, the terminal 66, the moveable contact 50a, the stationary contact 63, the terminal 62, and the ignition conductor 28' to the vehicle ignition system 18. Thus, it is no longer necessary that the ignition conductor 28 be energized via the ignition switch 14, however, the arming solenoid switch 48 is armed (in the dashed-line configuration) at this point and as soon as an unauthorized operator depresses the brake pedal to activate the brake light switch 20 or moves the gear shift knob to activate the reverse light switch 22, the relay coil 54 of the interrupting solenoid switch 46 is energized to thereby break the connection between the moveable contact 50a and the stationary contact 63. This arrangement ensures that when the authorized operator leaves the vehicle running a non-authorized person cannot steal his keys.

It will be appreciated by those of ordinary skill in the art that the apparatus for preventing unauthorized use of machinery (such as motor vehicles) of this invention provides a fail-safe system which will reset itself automatically each time the engine is turned off and restarted. Further, this apparatus will not interfere with normal vehicle operation after the system has been deactivated with the momentary disarming switch 42.

The apparatus of this invention has the benefit of not only providing anti-theft protection for a fully "off" vehicle, but also for a vehicle that is left unattended with the engine running. Similarly, the apparatus of this invention allows the vehicle key to be removed while the engine continues to run in a fully armed configuration to prevent theft or unauthorized operation.

The apparatus of this invention is safe to be used on modern computer controlled ignition systems and, in one embodiment, alerts owners of vehicles of non-authorized usage or attempted theft.

One benefit of the system of this invention is that it denies a thief the knowledge that an ignition disabling device is present.

Still further, the apparatus of this invention does not unduly drain a battery when it is armed and it allows the system to be continuously deactivated to allow an authorized use by someone other than the owner (maintenance personnel, valet parking, etc.).

Finally, the system of this invention allows stalled engine restarts without the need for an operator to continuously reset the device for each start. In this regard, the operator need only set the device once he is prepared to drive the vehicle.

While the invention has been particularly shown and described with reference to a preferred embodiment, it will be understood by those skilled in the art that various changes in form and detail may be made therein without departing from the spirit and scope of the invention. For example, it would be possible to include structure attached to the brake light switch so that only the second or subsequent other operations of the brake light switch would interrupt the ignition circuit. This would allow an authorized operator to start the engine with his foot on the brake without interrupting the vehicle ignition system.

Also, it would be possible to actuate the momentary disarming switch 42 by a remote control coded signal. In this manner, the driver could carry the remote control with him thereby ensuring that a thief cannot find the disarming switch.

Although the horn and headlights are used as the alarm in the embodiments describes herein, the apparatus could just as easily activate other types of alarms such as a siren or silent alarm. However, use of the vehicle horn and lights has the advantage of making the device more difficult for a potential thief to detect and utilizing already existing equipment. The apparatus could also function quite well with no alarm.

Although the described apparatus employs an LED as the armed indicator 40, other signaling devices could also be used. For example, existing vehicle lamps could be used to further disguise and conceal a presence of the apparatus of this invention.

In other embodiments, various switches could be substituted for the disarming switches 44 and 42. A substitute switch may be magnetically actuated, radio frequency actuated, etc., or may utilize existing switches in a vehicle as substitutes. Selection of deactivating switches could be made an owner option.

Similarly, various circuits could be used for the timer circuit and the flasher circuit. It is anticipated that the flasher circuit 26 will create a pulsing of current to the headlight 24 and the horn 26 for a period of time to be determined by the timer 58. The flasher circuit 26 acts to increase unwanted attention to the vehicle and also reduces current drain on the battery 12.

It will be appreciated by those of ordinary skill in the art that the various diodes used throughout the apparatus, depicted in the drawings, isolate various components from other components by preventing current flows in undesired directions. For example, the diodes leading to the headlights 24 and the horn 26 prevent counter flow to the flasher and timer when the headlights and horn are independently operated. It is not thought necessary to discuss each of the diodes.

The embodiments of the invention in which an exclusive property or privilege are claimed are defined as follows:

What is claimed is:

1. Apparatus for preventing unauthorized use of a machine having an internal combustion engine (such as a motor vehicle) with an electrical ignition system, said apparatus comprising:

an ignition control means coupling, in a main ignition path, said electrical ignition system to an electrical power supply for controlling flow of electrical current from the electrical power supply to said electrical ignition system and thereby determining if said internal combustion engine can run, said ignition control means including:

an interruption means coupled in said main ignition path between said electrical power supply and said electrical ignition system for having a rest position for providing an ignition flow of electrical current from said power supply to said electrical ignition system to thereby allow said engine to run and for having an interrupting position in which it interrupts said ignition flow of electrical current to said electrical ignition system, in response to a machine operator performing an activity for further operating said machine whereby said engine is thereby turned off and said operator is, therefore, prevented from further operating said machine with said engine running;

an arming means connected to said power supply and said interruption means for:

normally being in a disarmed position in which the interruption means is not moved out of the rest position in response to said engine operator performing said activity but moving to an armed positioned for arming said interruption means in response to said engine being started, whereby, in said armed position, said interruption means moves out of said rest position, and thereby interrupts said ignition flow of electrical current to said electrical ignition system and turns off said engine, in response to said engine operator performing said activity; and disarming said interruption means in response to a manual manipulation of said arming means whereby said interruption means is not moved from said rest position, to thereby interrupt said ignition flow of electrical current to said electrical ignition system and turn off said engine, in response to said engine operator performing said activity.

2. An apparatus as in claim 1 wherein said machine is a motor vehicle and said operating activity is at least one of moving a brake pedal and shifting a gear.

3. An apparatus as in claim 1 wherein said arming means includes a means for automatically continuing to hold said interruption means in an armed condition, once the engine is started and a manually operated switch for disarming said interruption means in response to manual manipulation thereof.

4. An apparatus as in claim 3 wherein said arming means includes an arming solenoid switch attached to the electrical power supply that is in a disarming position when it is at rest but which is energized to be moved to an arming position by electrical energy applied to an engine starter motor and which is thereafter maintained energized by current flowing through a pair of its own contacts.

5. An apparatus as in claim 4 wherein said manually operated switch of said arming means opens a circuit through said pair of its own contacts.

6. An apparatus as in claim 5 wherein a second pair of contacts of the arming solenoid switch provide an electrical path coupled to said interruption means over which the operator's performance of said activity is communicated to said interruption means for causing said interruption means to interrupt the electrical power to the electrical ignition system when said arming solenoid switch is in an arming condition.

7. An apparatus as in claim 6 wherein said interruption means comprises an interruption solenoid having a first pair of contacts which are closed in said rest position and open in said interruption position and a second set of contacts which maintains the interruption solenoid in the interruption position once the interruption solenoid is actuated.

8. An apparatus as in claim 3 wherein said arming means completes a temporary ignition path in parallel with a portion of said main ignition path, from said electrical power supply to said interruption means, in response to said engine being started.

9. An apparatus as in claim 8 wherein said portion of said main ignition path is key operated by a key-actuated ignition switch such that said temporary ignition path maintains said engine running even with a key removed from said key-actuated ignition switch after said engine has been started.

10. An apparatus as in claim 1 wherein said interruption means comprises an interruption solenoid having a first pair of contacts which are closed in a non-actuated condition of the interruption solenoid and open in an actuated condition thereof and a second set of contacts which maintains the interruption solenoid in the actuated condition once it is placed in the actuated condition.

11. An apparatus as in claim 1 wherein said arming means completes a temporary ignition path in parallel with a portion of said main ignition path, from said electrical power supply to said interruption means, in response to said engine being started.

* * * * *